(12) United States Patent
Li et al.

(10) Patent No.: US 7,304,098 B2
(45) Date of Patent: Dec. 4, 2007

(54) HYDROGEL FOR USE IN DOWNHOLE SEAL APPLICATIONS

(75) Inventors: Yanmei Li, Houston, TX (US); Jian Zhou, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/460,785

(22) Filed: Jul. 28, 2006

(65) Prior Publication Data

US 2006/0278391 A1 Dec. 14, 2006

Related U.S. Application Data

(62) Division of application No. 10/789,846, filed on Feb. 27, 2004, now abandoned.

(60) Provisional application No. 60/541,035, filed on Feb. 2, 2004.

(51) Int. Cl.
*C09K 7/02* (2006.01)
*E21B 33/13* (2006.01)

(52) U.S. Cl. .............. 523/130; 166/270; 166/294; 166/295

(58) Field of Classification Search ........ 166/294–295, 166/270; 523/130–131
See application file for complete search history.

(56) References Cited

U.S. PATENT DOCUMENTS

| | | |
|---|---|---|
| 4,572,295 A | 2/1986 | Walley |
| 4,918,121 A | 4/1990 | Peccoux et al. |
| 5,211,827 A | 5/1993 | Peck |
| 6,576,713 B2 | 6/2003 | Ishizaki et al. |
| 6,635,732 B2 | 10/2003 | Mentak |
| 6,667,029 B2 | 12/2003 | Zhong et al. |
| 6,692,766 B1 | 2/2004 | Rubinstein et al. |
| 6,699,503 B1 | 3/2004 | Sako et al. |
| 6,699,611 B2 | 3/2004 | Kim et al. |
| 2004/0052689 A1 | 3/2004 | Yao |
| 2004/0244978 A1* | 12/2004 | Shaarpour ............ 166/293 |

FOREIGN PATENT DOCUMENTS

| | | |
|---|---|---|
| JP | 59089383 | 5/1984 |
| WO | 9403743 A1 | 2/1994 |

OTHER PUBLICATIONS

"Rapid Swelling and Deswelling of Thermoreversible Hydrophobically Modified Poly(N-Isopropylacrylamide) Hydrogels Prepared by Freezing Polymerisation", Xue, W., Hamley, I. W. and Huglin, M. B., 2002, Polymer, 43(19) 5181-5186.
"Thermoreversible Swelling Behaviour of Hydrogels Based on N-Isopropylacrylamide with a Zwitterionic Comonomer", Xue, W., Champ, S. and Huglin, M. B., 2001, European Polymer Journal, 37(5) 869-875.
Dinarvand, R., D'Emanuele, A. (1995) The use of thermoresponsive hydrogels for on-off release of molecules. J. Control. Rel. 36: 221-227.
Seal-Tite Pressure Activated Sealant Technology, www.seal-tite.com.
Tanaka, T., Nishio, I., Sun, S.T., Ueno-Nishio, S. (1982) Collapse of gels in an electric field, Science. 218: 467-469.
Shihara, K., Hamada, N., Sato, S., Shinohara, I. (1984) Photoinduced swelling control of amphiphilic azoaromatic polymer membrane. J. Polym. Sci., Polym. Chem. Ed. 22: 121-128.
Ricka, J. Tanaka, T. (1984) Swelling of ionic gels: Quantitative performance of the Donnan theory, Macromolecules. 17: 2916-2921.
Swell Packer for Oil Based Mud, www.ews.as/swell1.html.

* cited by examiner

*Primary Examiner*—Peter Szekely
(74) *Attorney, Agent, or Firm*—David Cate; Tim Curington; Robin Nava

(57) ABSTRACT

The present invention is a composition for forming seals. The composition includes a base material and a hydrogel. The base materials is preferably an elastomer or a thermoplastic. Seals formed with the composition are particularly suited for use in a wellbore environment. The inclusion of hydrogel in the seals allows the seals to be manipulated or altered through certain environmental factors. For instance, temperature, oil/water ratio, pH and the electronic field may all be used to alter the characteristics of the hydrogel. In this way, the seal may be caused to swell in response to a specific stimulus, thereby preventing or sealing a leak without requiring additional work or input from the operator.

20 Claims, 3 Drawing Sheets

HYDROGEL FOR USE IN DOWNHOLE SEAL APPLICATIONS

REFERENCE TO RELATED PROVISIONAL APPLICATION

This application is a Divisional Patent Application of U.S. Non-Provisional patent application Ser. No. 10/789,846, filed Feb. 27, 2004, now abandoned, and claims the benefit of U.S. Provisional application Ser. No. 60/541,035, filed Feb. 2, 2004.

BACKGROUND OF THE INVENTION

1. Field of the Invention

The present invention relates generally to seals for oilfield applications. More specifically the present invention describes the use of hydrogel in seals for downhole use.

2. Description of the Prior Art

Seals, including o-rings, packer elements, Chevron seals, gaskets, etc., are widely used for numerous downhole oilfield applications. One ongoing issue in this area is how to energize seals and maintain sealing forces throughout seal service life. Capital loss or remediation associated with seal failure can be tremendous in certain operation areas.

One conventional method to energize seal is to utilize mechanical force to deform seal between sealing surfaces. For seals with large cross-section and/or large sealing gaps, satisfactory sealing performance is hard to achieve due to limited mechanical force. The other major problem encountered during operation is the relaxation of contact force between the seal and the sealing surfaces. This is caused primarily by the viscoelastic nature of polymeric materials used in conventional seals.

Another technique for improving seals involves the use of a pressure activated sealant that is specifically designed to seal leaks in wells and severe-environment hydraulic systems. The sealant functions by causing a pressure drop through a leak site, which in turn causes the sealant fluid to polymerize into a flexible solid seal. However, the major drawback of this technique is it requires a service engineer and a special tool to deliver the sealant to the leak site and complete the job. At that time, a significant amount of damage may have already occurred. Another disadvantage is that often tools which are installed 20,000 ft deep in the well where it is difficult and inefficient to deliver the sealant to the exact location where the leak occurs. Yet another drawback of this technique is that the sealant only starts to polymerize after a leak occurs. In certain cases, where the leakage is catastrophic, operation can fail before the polymerization process is completed.

Hydrogel technology has been rapidly developed in medical industry due to its unique response to environmental changes such as pH value, salinity, electrical current, temperature and antigens. Hydrogel is a flexible, rubber-like and solvent-swollen polymer. In an aqueous environment, hydrogel can undergo a reversible phase transformation that results in dramatic volumetric swelling and shrinking upon exposure and removal of a stimulus. A property common to all gels is their unique ability to undergo abrupt changes in volume. Gel can swell or shrink as much as 1000 times in response to small external condition changes. Through the conversion of chemical or electrical energy into mechanical work, a number of device have already been constructed which can produce forces up to 100 N/cm$^2$ and contraction rate on the order of a second. Using microscale hydrogel, the volumetric transition can occur within minutes or even seconds. The favorable scaling of hydrogel dynamic has been the essential element in the development of microfluidic devices that employ hydrogel valves for flow control. One major benefit of these devices is that they are completely autonomous and therefore require no external power source.

SUMMARY OF THE INVENTION

The present invention provides an improved seal material for use with both dynamic and static seal applications. In particular, the invention provides a seal material that is useful for downhole wellbore applications, including, but not limited to, o-rings, packer elements, chevron seals and gaskets.

A seal which is prepared or formed in accordance with the present invention includes a hydrogel polymer incorporated or included as part of the seal body. In this way, the seal may be activated when certain environmental parameters are manipulated or changed. These environmental parameters may include water/oil concentration, differential pressure, temperature, pH, and electronic field. The hydrogel polymer may be embedded, coated, attached or blended with other seal components to form the seal. Commonly used seal components may include elastomers, plastics or other materials known in the art.

Once incorporated into the seal body, the hydrogel provides several advantages over typical seal body components. First, the hydrogel allows the seal be to energized via swelling. Since hydrogel can swell as much as 1,000 times in volume, high swelling force can be utilized to energize the main seal body as well as anti-extrusion device.

The hydrogel may also allow potential leak paths to be sealed. Hydrogel swells in aqueous environment. That is, whenever it contacts an aqueous medium, it starts to absorb water and swell. For applications with hard-to-seal voids or surfaces, hydrogel can stop leak via swelling. Swelling leads to greater squeeze of main seal body. This, in turn, seals the leak path and prevents seal failure.

Another feature of seals incorporating hydrogel is the ability of the seals to be reset. That is, the seals may be provided in a first configuration, then upon exposure to a certain environmental parameter, the seal may change or take a second configuration. Upon removal of the certain environmental parameter, or upon exposure to yet another environmental parameter, the seal may then return to it's original configuration. This characteristic is particularly beneficial in downhole applications where a resettable seal is required.

These and other features of may be used employed either alone or in combination, depending on the specific nature of the application in which they are used.

DETAILED DESCRIPTION OF THE PREFERRED EMBODIMENTS

Figure 1:
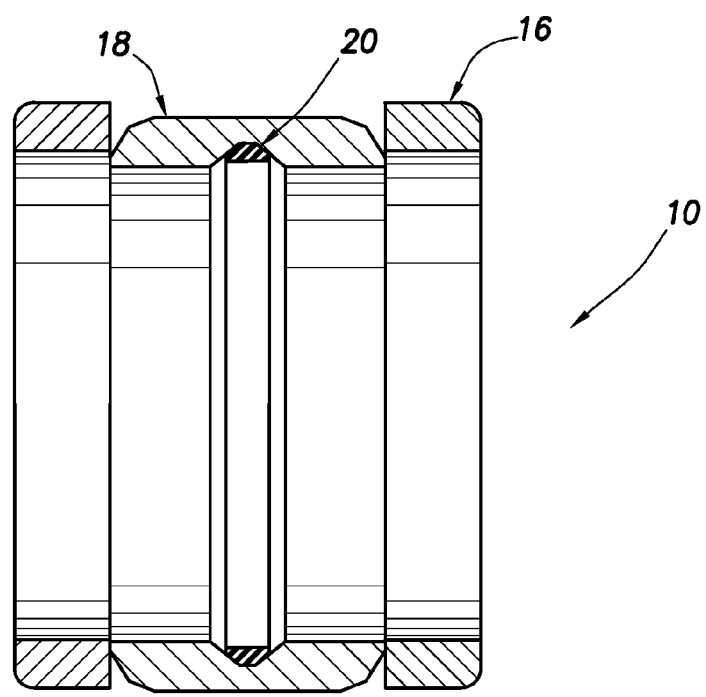
FIG. 1 shows a three-rubber element array.

Seals formed in accordance with the present invention comprise two primary elements: (1) a base material and (2) a hydrogel. The respective ratios of these two materials in the seal is determined the specific nature of the application in which the seals will be used. As previously mentioned, hydrogels can change their swelling behavior upon exposure to an external stimulus, such as pH, temperature, light, and electric field. Therefore, factors which may contribute to the selection of a proper ratio of base material to hydrogel may include the temperature to which the seal will be exposed, the pH at which the seal will be used, the nature of any chemicals the seal may come into contact with (including, for instance, the oil/water ratio), the differential pressure which the seal must withstand and the electronic environment of the application. Any number of these factors may effect the performance of the seal.

The base material of the seal is generally selected from any suitable material known in the industry for forming seals. Preferably, the base material is a polymer. More preferably, the base material is an elastomer or a thermoplastic. Elastomers that are particularly useful in the present invention include nitrile rubber (NBR), hydrogenated nitrile rubber (HNBR), carboxyl nitrile rubber (XNBR), silicone rubber, ethylene-propylene-diene copolymer (EPDM), fluoroelastomer (FKM, FEPM) and perfluoroelastomer (FFKM). Thermoplastics which are particularly useful in the present invention include Teflon®, polyetheretherketone, polypropylene, polystyrene and polyphenylene sulfide.

As used herein the term hydrogel is a broad phrase referring in general to a polymer that swells when used in aqueous environment. Hydrogel polymers useful in the present invention are preferably formed of a crosslinked polymer network. When this polymer network is exposed or immersed in a suitable solvent, the polymer chains in the network become solvated. In certain cases, crosslinkers may be provided to prevent the complete mixing of the polymer chains and the solvent by providing an elastic restoring force that counters the expansion of the network.

The polymer network of the hydrogel may be formed from any suitable polymeric material. In a preferred embodiment, the polymer network is formed from cross-linked polymers including water-soluble methylcellulose, cellulose acetate phthalate, and hydroxypropyl methylcellulose polymers, poly (ethylene oxide) polymers, guar and its derivatives, polyacrylamide, silicon-based materials, and flourosilicone based materials. In another embodiment, the hydrogel is a metal complex of a polymer selected from methylcellulose, cellulose acetate phthalate and hydroxypropyl methylcellulose polymers, poly (ethylene oxide) polymers, guar, derivatized guar, polyacrylamide, silicon-based polymers and fluorosilicone-based polymers.

Seals described in the present invention comprise a polymer and a hydrogel. The polymer and hydrogel may be combined in any suitable ratio using any suitable method. In a preferred embodiment, polymer/hydrogel blends may be prepared using any of the following methods: (1) a solution process; (2) a mesophase mediated process; (3) physical mixing/compounding, (4) injection or extrusion, (5) in-situ polymerization or (6) melt processing. Curing methods may be any suitable method, but is preferably thermal curing, microwave radiation or electronic beam radiation. Chemical modification, such as branching or grafting, of the hydrogel may be performed prior to manufacturing of polymer/hydrogel blends to achieve optimum dispersion of the hydrogel polymer.

Without limiting the scope of the invention, the following examples show specific seal configurations which may particularly benefit from the incorporation or inclusion of hydrogel in the seal material.

EXAMPLE 1

Packer Elements

FIG. 1 shows three-piece rubber element array or packer element 10, such as that commonly used in downhole packers. The packer elements are external packer seals that seal the annulus space between tubing and casing (not shown). Elements are energized by axial deflection of the seals after the packer is run into the hole. Commonly used packer elements typically consist of backup end rings 16 and a center seal or element 18. The center seal 18 typically includes a ring 20 which establishes the inner diameter of the seal. Hydrogel may be included or incorporated into any or all of the seal elements. The hydrogel allows the seals to be energized in response to external stimuli, as previously described.

Figure 2:
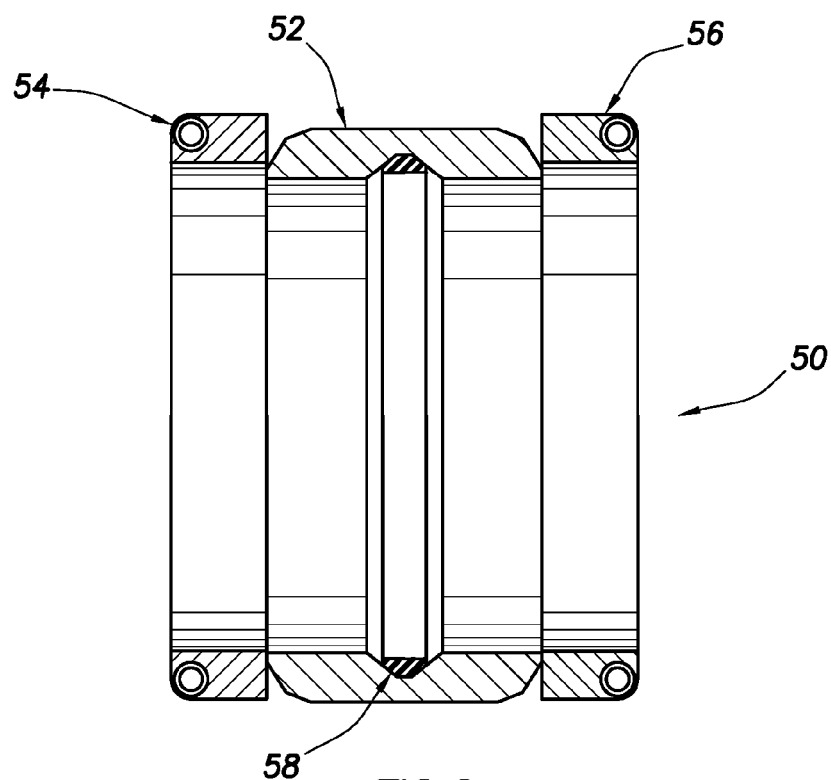
FIG. 2 shows a garter spring element array.

FIG. 2 shows a garter spring element array 50. The array 50 includes a main element or seal 52, a garter spring 54 and backup end rings 56. The array also includes an ID ring 58. Hydrogel may be included in any or all of the seals of the array. As with the assembly of FIG. 1, the garter spring array also benefits from the inclusion of hydrogel seal components by allowing them to respond to external stimuli.

Figure 3:
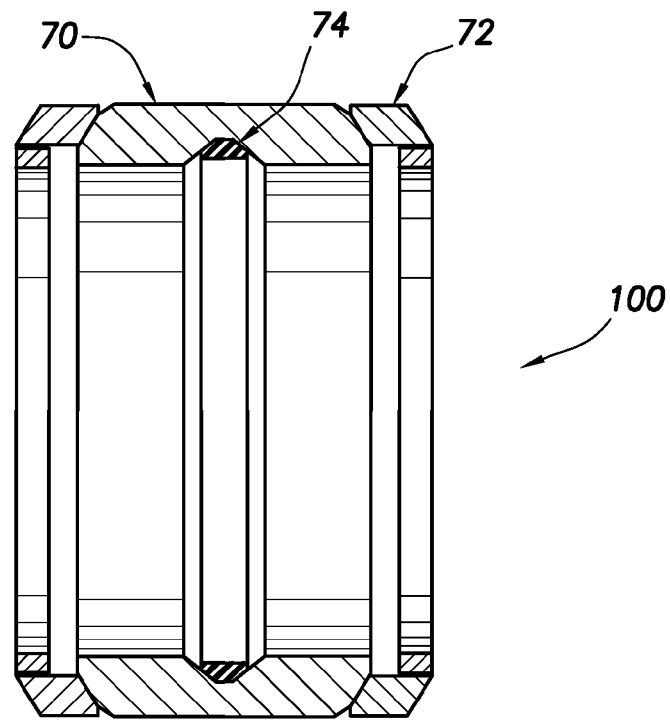
FIG. 3 shows a packer element array.

FIG. 3 shows yet another packer element array 100. This array includes a main seal 70, backup seals 72 and an ID ring 74. As with the seals shown in FIGS. 1 and 2, hydrogel may be included in any or all of the seals.

EXAMPLE 2

O-Ring

Figure 4:
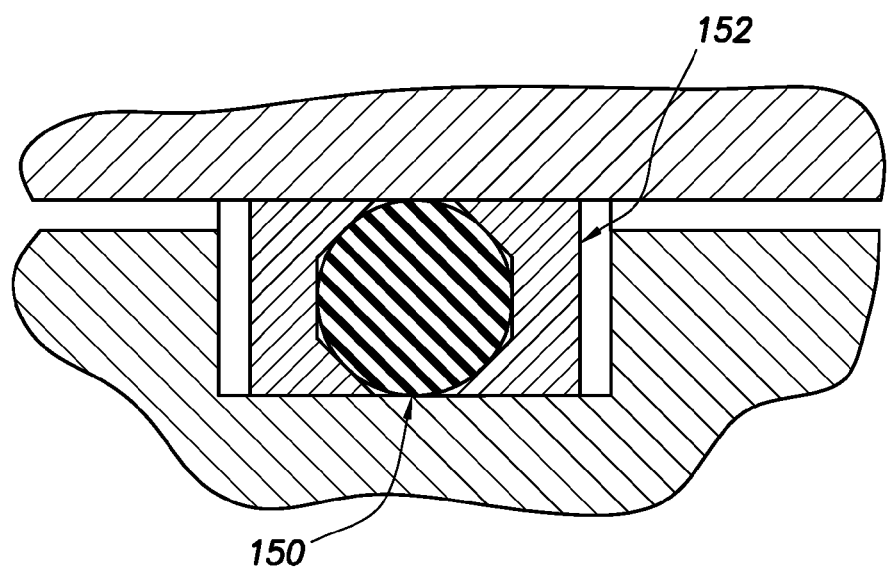
FIG. 4 shows an o-ring with backup rings.

O-rings are simple bi-directional static seals. For high temperature and/or high pressure sealing applications, backup rings are used to prevent O-ring extrusion. As shown in FIG. 4, the o-ring 150 includes two backup rings 152 which are formed of thermoplastic materials blended with hydrogel polymer. The O-ring may also be formed of elastomers blended with hydrogel polymer. In this application, the hydrogel is able to seal off potential leak paths as well as keep the o-ring energized via swelling. These characteristics are not achievable with existing conventional rubber materials used for o-ring applications.

EXAMPLE 3

T-Seal

Figure 5:
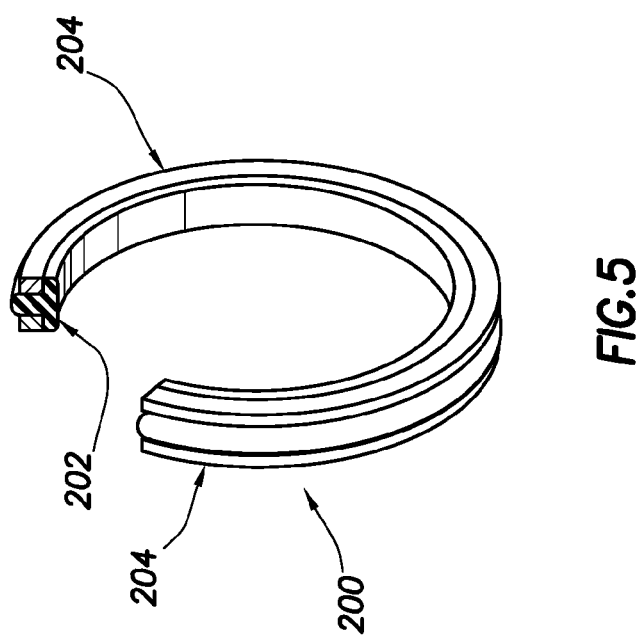
FIG. 5 shows a t-seal.

T-seals are typically used as reciprocating bi-directional dynamic seals. As shown in FIG. 5, T-seal 200 including seal body 202 and retaining ring 204. The seal body is formed of a hydrogel modified thermoplastic or elastomer. Hydrogel can seal off potential leak paths as well as keep the T-seal energized via swelling. These benefits are not achievable with existing conventional rubber materials used for T-seal application.

EXAMPLE 4

Seal Stack/Packing

Vee packing or chevron seal stacks are multiple seal lip multi-component seal sets that are energized by differential pressure. Seal stacks are also suited to internal dynamic seal applications. Most conventional packing stacks are combinations of softer elastomer parts and harder plastic parts. The incorporation of hydrogel in the seal elements allows any potential leak paths to be sealed, as well as keeping seal stack energized via swelling. This is not achievable with existing conventional rubber materials used for seal stack applications.

Figure 6:
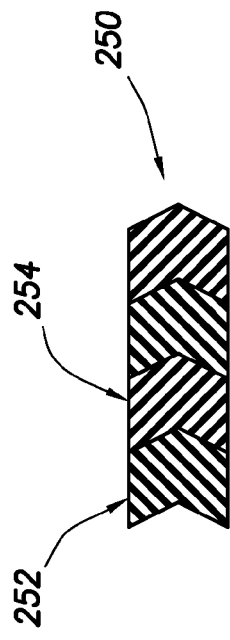
FIG. 6 shows a chevron seal stack.

FIG. 6 shows a seal stack 250 having first hydrogel/elastomer elements 252 and second hydrogel/plastic elements 254. These first and second elements are preferably alternating, as shown. However, depending on the specific nature of the application any configuration of first and second elements may be used.

EXAMPLE 5

Spring-Energized Seal

Figure 7:
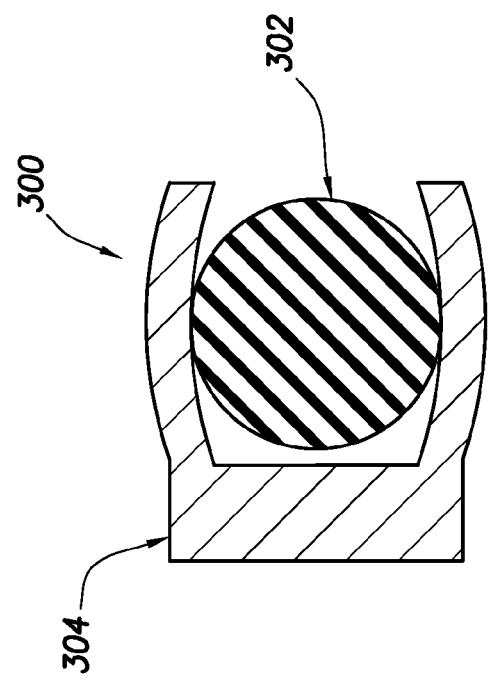
FIG. 7 shows a spring energized seal.

Spring-energized seals are uni-directional seals and may be either static or dynamic. These seals combine the benefits of packing, as seen in vee or chevron seals and radial compression as seen in o-rings. As shown in FIG. 7, a spring-energized seal 300 will be made of hydrogel modified thermoplastic or rubber materials. Hydrogel can seal off potential leak path as well as keep seal energized via swelling which is not achievable with existing conventional rubber materials used for seal application.

We claim:

1. A method for forming a seal in a wellbore comprising:
   a. providing a composition comprising: (a) a hydrogel and (b) a base material;
   b. deploying the composition into a wellbore; and,
   c. exposing the composition to a first environmental parameter, thereby forming a seal in the wellbore, the seal in a first configuration;
whereby the seal isolates a particular wellbore zone from another wellbore zone or region of a subterranean formation and wherein the seal formed is an o-ring, a t-seal body, a chevron seal body, a spring seal body, a packer element, a gasket, or a bridge plug.

2. The method of claim 1 further comprising exposing the seal to a second environmental parameter causing the seal to form a second configuration.

3. The method of claim 2 further comprising removing the certain environmental parameter thus causing the seal to return the first configuration.

4. The method of claim 1, wherein the base material is a polymer.

5. The method of claim 4, wherein the polymer is an elastomer.

6. The method of claim 5, wherein the elastomer is selected from the group consisting of nitrile rubber, hydrogenated nitrile rubber, carboxyl nitrile rubber, silicon rubber, ethylene-propylene-diene copolymers, fluoroelastomers and perfluoroelastomers.

7. The method of claim 4 wherein the polymer is a thermoplastic.

8. The method of claim 7, wherein the thermoplastic is selected from the group consisting of polytetrafluorethylene, polyetheretherketone, polypropylene, polystyrene and polyphenylene sulfide.

9. The method of claim 1 wherein the hydrogel is selected from the group consisting of: methylcellulose, cellulose acetate pthalate and hydroxypropyl methylcellulose polymers, poly (ethylene oxide) polymers, guar, derivatized guar, polyacrylamide, silicon-based polymers and fluorosilicone-based polymers.

10. The composition of claim 1 wherein said hydrogel is a metal complex of a polymer selected from the group consisting of: methylcellulose, cellulose acetate pthalate and hydroxypropyl methylcellulose polymers, poly (ethylene oxide) polymers, guar, derivatized guar, polyacrylamide, silicon-based polymers and fluorosilicone-based polymers.

11. The method of claim 1 wherein the first environmental parameter is selected from the group consisting of water concentration, water/oil concentration, differential pressure, temperature, pH, and electronic field.

12. The method of claim 1 wherein the first environmental parameter is presence of water, and wherein the seal is formed by swelling of the hydrogel.

13. The method of claim 1 wherein the hydrogel is embedded with the base material.

14. The method of claim 1 wherein the hydrogel is coated upon the base material.

15. The method of claim 1 wherein the hydrogel is attached to the base material.

16. The method of claim 1 wherein a blend of the hydrogel and the base material is prepared before the deployment into the wellbore.

17. The method of claim 16 wherein the blend is prepared using techniques selected from the group consisting of: a solution process; a mesophase mediated process; physical mixing/compounding; injection; extrusion; in-situ polymerization; and melt processing.

18. The method of claim 16 wherein the blend is cured using techniques selected from the group consisting of: thermal curing; microwave radiation; electronic beam radiation.

19. The method of claim 16 wherein the hydrogel is chemically modified to achieve optimum dispersion of the hydrogel polymer.

20. A method for forming a seal in a wellbore comprising:
   a. providing a composition comprising: (a) a hydrogel and (b) a base material;
   b. deploying the composition into a wellbore; and,
   c. exposing the composition to a first environmental parameter, thereby forming a seal in the wellbore, the seal in a first configuration;
whereby the seal isolates a particular wellbore zone from another wellbore zone or region of a subterranean formation and wherein the hydrogel is a metal complex of a polymer selected from the group consisting of: methylcellulose, cellulose acetate pthalate and hydroxypropyl methylcellulose polymers, poly (ethylene oxide) polymers, guar, derivatized guar, polyacrylamide, silicon-based polymers and fluorosilicone-based polymers.

* * * * *